United States Patent [19]
Gaynor et al.

[11] Patent Number: 4,874,622

[45] Date of Patent: Oct. 17, 1989

[54] SPICE-ODOR ANTIMYCOTIC CONTAINING CELLULOSIC CASING ARTICLE

[75] Inventors: Dennis A. Gaynor, Woodridge; James R. Hansen, Tinley Park, both of Ill.

[73] Assignee: Viskase Corporation, Chicago, Ill.

[21] Appl. No.: 68,301

[22] Filed: Jul. 1, 1987

[51] Int. Cl.$^4$ ............................................. A22C 13/00
[52] U.S. Cl. .................................. 426/135; 138/118.1; 428/34.8
[58] Field of Search ............... 426/135, 138, 323, 326, 426/532; 138/118.1; 428/36, 34.8

[56] References Cited

U.S. PATENT DOCUMENTS

| | | | |
|---|---|---|---|
| 1,048,674 | 12/1912 | Fitzgerald | 426/133 X |
| 2,325,624 | 8/1943 | Musher | 426/133 X |
| 3,617,312 | 11/1971 | Rose | 426/135 X |
| 4,377,187 | 3/1983 | Chiu | 426/105 X |
| 4,409,251 | 10/1983 | Higgins | 426/413 |
| 4,662,403 | 5/1987 | Hammer et al. | 426/532 X |
| 4,664,861 | 5/1987 | Pritikin et al. | 426/135 X |

FOREIGN PATENT DOCUMENTS

1584435  5/1975  United Kingdom .

OTHER PUBLICATIONS

Maruzzella et al, "Action of Odoriferous Organic Chemicals and Essential Oils on Wood–Destroying Fungi", Plant Disease Reporter, vol. 44, No. 10, Oct. 15, 1960, pp. 789–792.

Pruthi, *Spices and Condiments: Chemistry, Microbiology, Technology*, 1980, pp. i–xvi, 1–44.

Katayama et al, "Chemical Significance of the Volatile Components of Spices in the Food Preservative Viewpoint III", *J. Fac. Fish Anim. Husb.*, 2 (2), pp. 355–358 (1959).

Maruzzella et al, "The Action of Essential Oils on Phytopathogenic Bacteria", *Plant Disease Reporter*, vol. 47, No. 1, pp. 23–26 (1-15-63).

*Primary Examiner*—Arthur L. Corbin
*Attorney, Agent, or Firm*—Cedric M. Richeson; John C. Lefever

[57] ABSTRACT

A moisturized cellulosic casing article with water activity of at least 0.80 and having in the casing wall and a spice-derived natural or synthetic equivalent antimycotic compound, such as eugenol or vanillin, imparting a food-related odor to the casing but at concentration below about 0.2 percent based on the total casing article weight.

12 Claims, No Drawings

SPICE-ODOR ANTIMYCOTIC CONTAINING CELLULOSIC CASING ARTICLE

FIELD OF THE INVENTION

This invention relates to an improved cellulosic casing article of both the fiber reinforced and unreinforced types, and more particularly to a premoisturized cellulosic food casing article which is resistant to growth of

BACKGROUND OF THE INVENTION

Types of Casings

Artificial food casings used throughout the world in processing a great variety of meat and other food products, such as sausages of various types, cheese rolls, turkey rolls, and the like are customarily prepared from regenerated cellulose and other cellulose materials. Casings are of several different types and sizes to accomodate the different categories of food product to be prepared and are provided in supported or unsupported form, the supported casings, commonly referred to as "fibrous casings", having a fibrous support web embedded in the casing wall.

A common feature of many processed food products, particularly meat products, is that the mixture of comestible ingredients, commonly called an "emulsion", is stuffed into a casing under pressure, and processing of the food product is carried out after its encasement. The food product may also be stored and shipped while encased in the casing, though in many instances, and particularly with small sausage products such as frankfurters, the casing is removed from the food product after completion of the processing.

The designation "small size food casings" refers generally to those casings employed in the preparation of small size sausage products such as frankfurters. As the name suggests, this type of food casing is small in stuffed diameter, generally having a diameter within the range of from about 15 mm to about 40 mm, and is most usually supplied as thin-walled tubes of very great length. For convenience in handling, these casings, which may be 20 to 50 meters in length or even longer, are shirred and compressed to produce what is commonly referred to as "shirred casing sticks" of from about 20 cm to about 60 cm in length. Shirring machines and the products thereof are shown in U.S. Pat. Nos. 2,983,949 and 2,984,574 among others.

"Large size food casings", the common designation for casings used in the preparation of generally larger food products, such as salami and bologna sausages, meat loaves, cooked and smoked ham and smoked pork butts and the like, are produced in stuffed diameters sizes of from about 50 mm to about 200 mm or even larger. In general, such casings have a wall thickness about three times greater than "small size casings" wall thickness, and are usually provided with a fibrous web reinforcement embedded in the wall, though they may be prepared without such supporting medium. Traditionally the large size tubular casings have been supplied to the food processor in flattened condition, cut to predetermined lengths of from about 0.6 m to about 2.2 m. Improvements in shirring and packaging techniques and increased use of automatic stuffing equipment has increased the demand for supplying large size casings of both the fibrous and the unsupported types in the form of shirred sticks containing up to about 30 m and even more of casing.

Illustrative optional minor ingredients that may be present in amounts of less than 50 (preferably less than 25) weight percent in the casing based on the total casing weight include, for example, peeling aid coatings such as carboxymethylcellulose, mineral oil and an emulsifier for small size casing or alkyl-ketene dimer for large size casing; moisture barrier coatings, such as vinylidene chloride copolymer coatings; plasticizers and softeners such as oils including animal fatty oils such as lard oil and vegetable fatty oils such as castor oil, or corn oil, soya oil, safflower oil, tung oil, or mineral oil; pigments and fillers such as titanium dioxide, and dyes such as the well-known food dyes.

Cellulosic casings are flexible, usually seamless tubing formed of regenerated cellulose, cellulose ethers and the like, and can be prepared by known processes, such as the cuprammonium process, the deacetylation of cellulose acetate, the denitration of cellulose nitrate, and preferably the viscose process. Fibers used to reinforce cellulosic tubular casings may, for example, be rice paper, hemp, rayon, flax, sisal, nylon, and polyethylene terphthalate. Tubular fibrous casings can be made by methods and apparatus described, for example, in U.S. Pat. Nos. 2,105,273; 2,144,899; 2,910,380; 3,135,613; and 3,433,663.

As is well known in the art, tubular cellulosic casings prepared by any one of the well known methods are generally treated with a polyol/as for example glycerine, as a humectant and softening or plasticizing agent, to provide resistance to drying or cracking of the casing during storage and handling prior to stuffing. The glycerine treatment is usually carried out by passing the casing while still in its gel state through an aqueous glycerine solution, after which the plasticized casing is dried to a predetermined moisture content prior to further processing or winding up on reels for interium storage. Generally, large size cellulosic casings will contain about 2% to 35% glycerine based on the weight of dry cellulose, and small size cellulosic casing contain about 9% to 17% glycerine on the same basis. However, as discussed hereinafter in greater detail, there is a trend toward lower glycerine content and greater reliance on water as a softener in cellulosic casings.

CASING MOISTURE CONTENT

In preparation and use of cellulosic food casings, moisture content is of extreme importance. When small size cellulosic casings are made, it is generally necessary that they be dried to a relatively low water content, usually in the range of about 8% to 12% of the casing total weight, to enable shirring operations to be carried out without damage to the casings. To permit ready deshirring of the compressed, shirred small size cellulosic casing and prevent tearing and breaking of the casing during stuffing operations, shirred small casings having an average moisture content of between about 14% to 18% of total weight are required. This relatively narrow range of moisture content is important because excessive breakage of the casing during stuffing has been found to occur at lower moisture contents and greater moisture content results in excessive plasticity of the casing material and overstuffing.

The large size food casings are characterized by relatively thicker walls than small food casing walls and, therefore, require higher moisture content to provide the extensibility required for stuffing operations without causing undesirably high levels of internal pressure. Large size casings were traditionally supplied in short lengths of substantially dry flattened tubing. They are quite stiff in the dry state, and softened for stuffing operations by soaking in water to raise the moisture content to about full saturation. More recently, however, the wider use of automatic stuffing equipment for products utilizing large size tubular food casings, and the increased demand for supplying such casings in greater lengths in shirred form, has emphasized the problems attending moisturizing such casings by soaking such prior to the stuffing operation. Moreover, the need for greater quality control of all aspects of the manufacture and use of large size food casings has become increasingly evident. Casing moisture content has been found to be a factor in control of product uniformity as well as in meeting the need to readily continually and economically stuff the casings without damage or breakage thereof, and with consistently reproducible results.

As a result of the foregoing factors, many large size tubular fibrous reinforced cellulosic food casings are now premoisturized by adding carefully controlled amounts of moisturizing water to the extent that the casing can be stuffed without the necessity of any pre-stuffing soaking. The amount of the controllably added moisture may be varied to provide a casing having a moisture content ranging from as low as about 17 percent to as high as about 35 percent based on the total weight of the casing. The preferred moisture content range depends on the type of product to be stuffed into the casing. For example, for whole boneless hams, the preferred range is from about 20% to about 26% moisture based on total casing weight. For meat emulsions, the preferred range is from about 17% to about 23%.

SPOILAGE MICROORGANISM GROWTH

One problem which occurs during the handling, storage and processing of high moisture content cellulosic food casings involves the growth of molds, yeasts, or bacteria, since high moisture is one of the necessary factors for inducing such growth on cellulosic casings. It is known for example, that cellulosic food casings have a critical moisture content above which the growth of spoilage microorganism during periods of storage is greatly enhanced. Generally the critical moisture content is lower for mold than for yeast and bacteria so that a moisture content preserving casing from mold spoilage will also prevent yeast or bacterial spoilage. For glycerine contents of at least about 23% dry cellulose, keeping the moisture content of cellulosic casings below about 17% by weight of moisture based on the total weight of the casing, has been found to be an effective measure to control the development of such growth. The commercial experience has been that no spoilage occurs for such casings; however, as previously explained such casings must then be further moisturized by soaking prior to stuffing. In cases where limitation of the moisture content cannot be used to inhibit such growth, such as where higher moisture contents are purposefully provided, as for example the previously described premoisturized cellulosic casings of the "no soak" type or where higher moisture concentrations may occur in stored casings due to random temperature differentials across sections of the casing, it is necessary to provide other means to inhibit the growth of spoilage microorganisms.

ANTIMYCOTICS

For the aforementioned reasons, it has been commercial practice to include one or more mold growth inhibiting constituents in high moisture content cellulosic casings which are to be stored for substantial periods prior to food stuffing usage.

A phenomenon widely used by the prior art to quantify the moisture content in cellulosic casings is known as "water activity". Water activity, represented by the symbol $A_w$, is defined as the ratio of the vapor pressure of water in a solution to the vapor pressure of pure water, both measured at the same temperature. Literature references treating the water activity phenomenon in greater detail include Ross, Estimation of Water Activity In Intermediate Moisture Foods, Food Technology, March 1975, page 26, and in Journal of Food Science, Vol. 41, page 532, May-June 1976.

In general, the prior art has approached the problem of inhibiting mold growth in high moisture content-cellulosic casings by employing compounds which reduce the water activity of the casings. Such compounds include polyhydric alcohols such as glycerine and propylene glycol, and chloride salts.

By way of illustration, it has been proposed to increase the glycerine content in the casing to at least about 40 weight percent base upon the weight of dry cellulose in the casing. If the glycerine content is at this general level and the moisture content of the large diameter fibrous casing is between about 17 and about 30 weight percent, the water activity will be maintained at not greater than 0.80. Following this procedure, the growth of molds, yeasts and bacteria is inhibited for the periods of typical commercial storage. However, polyhydric alcohols such as glycerine are expensive, and in fact the trend is towards lower glycerine content in cellulosic casings for this reason. Another problem with certain polyhydric alcohols, particularly propylene glycol, is that they are not acceptable for use with foodstuffs by the laws of certain countries. If, however, the glycerine content is reduced to a relatively low level which is below the casing softener requirement, another softener must be provided and most frequently this is additional water. In these instances the water activity of the casing is at least 0.80 and an antimycotic agent is clearly needed. That is, a high water activity may be due to either relatively high moisture content or relatively low polyol content or a construction thereof.

Another antimycotic approach is to introduce a chloride salt as for example in the moisturizing water. For example sodium chloride in a loading of from about 2% to 22% of the cellulose (dry) weight will protect against mold growth in casings with moisture contents of from about 20% to 40% of total casing weight by maintaining the water activity at about 0.75. However, in addition to the cost of such high chloride salt concentration, these compounds tent to corrode the chemical processing equipment in which they are used.

It is also known that liquid smoke, derived from the controlled oxidation of wood, inhibits mold growth. Liquid smoke may for example be impregnated in the cellulosic casing wall by contact with the casing external surface. However, liquid smoke has a distinct odor which may be objectionable to certain individuals who handle the liquid smoke-impregnated cellulosic casing in the food processing plant during the stuffing operation. Moreover, the impregnated smoke may pass through the casing wall and penetrate the encased food.

For these reasons, only a very dilute concentration of liquid smoke is considered suitable for commercial use as an antimycotic in cellulosic casings where smoke color, flavor or odor is not desired.

Another problem is the unexpected discovery that very dilute liquid smoke antimycotic does not prevent the growth of certain molds and yeasts. More particularly, it has been discovered that certain microorganisms which are frequently found in casing and food manufacturing environments are not immobilized by liquid smoke antimycotic in dilute concentrations otherwise acceptable to most food processors from an odor standpoint. These microorganisms (hereinafter collectively referred to as "antimycotic-resistant microorganisms") are the two molds Paecilomyces varioti (appears brown) and Paecilomyces varioti (appears white), and the yeast Rhodotorula glutins.

A further problem with the use of potential antimycotic materials in cellulosic food casings is that they must be approved by governmental agencies for use in foods. This is because even if impregnated in the casing outer surface, a portion of the antimycotic may migrate through the casing wall during processing and contact the encased food outer surface or enter the processed food mass itself. The likelihood of this occuring is of course greatly increased if the antimycotic is incorporated during the casing manufacturing process or impregnated in the casing inner wall as by slugging. Certain chemical reaction-prepared antimycotics are unacceptable from this standpoint. For these reasons, the ideal antimycotic is a naturally occurring material or a synthetically prepared equivalent of a naturally occurring material which is commonly used in foods. There is a very high likelihood that such material will be approved for use as an antimycotic in cellulosic food casings.

A further desirable attribute of an antimycotic is that it not only lacks an objectionable odor, but in fact provides an odor to the food casing which is pleasing in the sense of being associated with a generally recognized and acceptable food odor. This is desirable irrespective of whether the casing is peeled off after food processing (eg. frankfurter type), or peeled off by the consumer (eg. liverwurst type). As previously discussed in connection with liquid smoke antimycotic, the food processor is concerned with the casing odor. Also, during processing the antimycotic may migrate to the encased food outer surface or mix the food mass, as previously explained.

In part because of these last two reasons, chemically synthesized antimycotics which do not have naturally occurring counterparts and which do not provide a generally acceptable food odor, have not been widely accepted in commerical practice. One illustration of such materials are parabens or parahydroxy-benzoic acid esters as described in U.S. Pat. No. 4,664,861.

A still further desired characteristic of antimycotics in certain cellulosic casings used to contain food is that they not color the food. That is, they should provide the needed retardation against growth of molds and yeasts when used at a concentration which does not color the casing itself or the food processed therein.

As previously explained, certain antimycotic flavors unrelated to food may be objectionable to a limited number of people handling the cellulosic casing or for certain food products processed in their casings, eg. liquid smoke. However, an antimycotic in certain cellulosic casings which does not color either the casing or the food and which does not color either the casing or the food and which does not impart on objectionable odor, may be quite acceptable and perhaps preferred if it provided a pleasing food-related flavor to the cellulosic casing and even the food processed therein.

An object of this invention is to provide a cellulosic casing article having water activity of at least 0.80 which does not exhibit growth of antimycotic-resistant microorganisms under commercial storage conditions, due to the presence of naturally occurring or synthetic equivalent antimycotic which imparts a pleasing food-related odor to the article.

Another object is to provide such a casing article which is not colored by the antimycotic and which does not transfer antimycotic color to the food stuffed and processed at elevated temperature in the casing, but if flavored the flavor is a pleasing food-related taste from the antimycotic and imparts this taste to the food.

Other objects will become apparent from the ensuing disclosure and appended claims.

SUMMARY OF THE INVENTION

We have discovered that the objects of this invention are realized by a moisturized cellulosic casing article with water activity of at least 0.80 and having in the casing wall a spice-derived natural or synthetic equivalent antimycotic compound inparting a food-related odor to the casing but at concentration below about 0.2 percent based on the total casing article weight, the antimycotic compound comprising a benzene ring containing at least one (1) phenolic hydroxyl group and at least two (2) hydrogen substitutions (F) wherein F is a member selected from the group consisting of alkoxy, alkyl and acyl groups. At least one (1) of these F members is either an acyl group or comprises at least two (2) carbon atoms.

The cellulosic casing of this article may be either the small size thin-walled nonreinforced type, or the large size thick walled type, either nonreinforced or fiber-reinforced. The casing is moisturized in the sense that it contains water in quantity which may be sufficient for stuffing without further moisturization (no-soak) or may require full soaking before stuffing. For nonreinforced casing the moisture content is preferably between about 15 and about 30 percent water (of the casing article total weight) to provide the needed moisture for deshirring without damage and also insure food product uniformity without resulting in excessive plasticity of the casing. At the same time the polyol content is preferably less than about 16% of the dry cellulose weight to achieve the desired plasticity but minimize cost of this relatively expensive contituent.

For fiber-reinforced cellulosic casings the water content is preferably between about 17 and about 75% of the casing article total weight and the polyol content is preferably less than about 23% of the dry cellulose weight, all for the same reasons discussed in connection with nonreinforced casing.

The water activity of the cellulosic casing article with the antimycotic compound is at least 0.80. This means that the antimycotic does not function by suppressing the water activity to a level at which growth of the antimycotic-resistant microorganisms is merely inhibited.

As used herein, the following terms or expressions have the stated meaning:

"Spice-derived naturally occurring or synthetic equivalent antimycotic compound" means: (a) either a compound which occurs in nature or a synthetic compound which is substantially identical in chemical composition to a compound occurring in nature, (b) which is commonly used to impart flavor to food, and (c) which adversely affects molds and yeasts in high moisture atmospheres.

"Alkyl" group means any of the following aliphatics: alkanes, alkenes, alkynes and cyclic aliphatics.

DETAILED DESCRIPTION OF THE INVENTION

Primarily because of its phenolic constituents, liquid smoke is a well-known antimycotic. For example, in a fiber-reinforced cellulose casing impregnated with dilute solutions of Charsol C-3 (purchased from Red Arrow Products Company, Manitowoc, Wisconsin), the major constituent phenolic concentrations are as follows: (all on dry cellulose basis)

TABLE A

Liquid Smoke Phenolic Concentrations (ppm)

For 1.97 wt.% Charsol C-3:
  Phenol - 0.17
  Ethyl-methoxy phenol - 0.06
  Methyl phenol - 2.6
  Dimethyl phenol - 1.9
  Dimethoxy phenol - 6.8
For 0.985 wt.% Charsol C-3:
  Phenol - 0.044
  Ethyl-methoxy phenol - 0.044
  Methyl phenol - 0618
  Dimethoxy phenol - 5.78

Notwithstanding the presence of these antimycotic phenolics, dilute Charsol C-3 did not prevent growth of the aforementioned three antimycotic-resistant microorganisms in dilute water solution. Higher concentration liquid smokes impart a distinct color odor or flavor to the encased food product. While this is desired for certain food products, for others these characteristics are unacceptable. Accordingly, higher concentration liquid smokes are not generally used as antimycotics in cellulosic casings.

In marked contrast, we have discovered that the moisturized cellulosic casing article of this invention prevents growth of these antimycotic-resistant microorganisms without coloring the encased food product. At the same time, this article provides a pleasing spice odor to the casing and the processed food. Moreover, the antimycotic constituents of this article are naturally occurring or synthetic equivalent compounds, so should be acceptable for food use by governmental agencies.

The effectiveness of these particular antimycotic compounds is believed due to their specific chemical compositions as comprising a benzene ring containing at least one (1) phenolic hydroxyl group and at least two (2) hydrogen substitutions (F) wherein F is a member selected from the group consisting of alkoxy, alkyl and acyl groups, and wherein at least one (1) of the F members is either an acyl group or comprises at least two (2) carbon atoms. In contrast, liquid smoke derived from the partial oxidation of wood do not contain significant concentration of phenolic constituents with at least two F members wherein F is either an alkoxy, alkyl or acyl group and wherein at least one of the F members is an acyl group or comprises at least two (2) carbon atoms.

Among the natural spice flavoring materials suitable for use as the antimycotic compound in the inventive cellulosic casing article are bay leaves, cinnamon leaf, clove, laurel leaf and pimenta. Each of these spices contains eugenol which comprises a benzene ring with one phenolic hydroxyl group and two hydrogen substitutes (F) which are alkoxy and alkyl groups (1-allyl-3-hydroxy-4-methoxybenzene). Iso-eugenol is also suitable.

Another natural spice flavoring material which is suitable is vanilla, commonly available in the extract form (vannillin). It also has two hydrogen substitutions (F) which are acyl and alkoxy groups (3-methoxy-4-hydroxy benzaldehyde). Ethyl vanillin (m-ethoxy-p-hydroxy benzaldehyde) is also suitable.

Still other suitable natural spice flavoring materials are originum and savory oil. They contain carvacrol which is 2 hydroxy-4 isopropyl-1 methyl benzene. The spice-derived natural or synthetic equivalent antimycotic compound may be introduced to the fiber-reinforced no-soak casings by incorporation in the moisturization medium in a solubilizer such as an ethoxylated sorbitan fatty acid ester or ethyl alcohol, if the antimycotic is not soluble in water. For small size nonreinforced casings the antimycotic may be incorporated with or without polyols into the moisturizing solution immediately prior to shirring.

Alternatively, the antimycotic may be incorporated by dissolution in the glycerine or other polyol bath which is diffused into regenerated gel stock prior to drying. This method is suitable for both small and large diameter cellulosic casing.

DETAILED DESCRIPTION OF INVENTION

EXAMPLE I

In this example, a series of solutions of antimycotics were madein aerated water. Each solution (antimycotic system) was inoculated with molds and yeasts which were isolated as naturally occurring air borne contaminants obtained from within food casing manufacturing sites, plus the aforementioned three antimycotic-resistant microorganisms. The concentrations were such that on a calculated basis 30,769 colony forming units (CFU) per milliliter resulted. The inoculated systems were allowed to age for 72 hours to facilitate antimicrobial action of the various antimycotic systems. The systems were mixed at a series of concentrations with potato dextrose agar (PDA) and plate count agar (PCA) and allowed to incubate for 7 days at 20° C. and 48 hours at 30° C., respectively. After this incubation, the plates were analyzed and viable colonies of molds/yeasts were counted and compared to the initial CFU loading. Conditions utilized in the evaluation were very favorable with respect to growth promotion of the CFU's. The antimycotic-resistant microorganisms are much more likely to grow in a liquid environment where the contact between liquid and the microorganisms is much greater than on moisturized cellulose casing substrate.

The antimycotics used in these tests were Charsol C-3 liquid smoke; vanillin crystals purchased from Aldrich Chemical Company, Milwaukee, Wisconsin; ethyl vanillin crystals also purchased from Aldrich; and eugenol 50 weight % aqueous solution purchased from Flavorchem Company, Downers Grove, Illinois.

Table B details the mold and yeast species used in culturing of the antimycotic systems of these tests. Table C details compositions of the tested systems. Tables D and E report the percent liquid phase concentration of each system in PCA and PDA respectively, and the resultant number of CFU's after appropriate incubation. In each instance the colony count system concentration (wt. % liquid phase) in each solution is reported. The incubation period was 48 hours at 30° C. (Table D).

TABLE B

SUMMARY OF MOLDS AND YEASTS USED IN ANTIMYCOTIC STUDY

| VISKASE FSI Designation | Type |
|---|---|
| $P_2B$ | Penicillium sp |
| $P_2D$ | Penicillium sp |
| $P_2E$ | Penicillium sp |
| $P_4$ | Trichoderma sp |
| $P_5$ | *Humicola grisea* |
| $P_{11}A$ | Penicillium sp |
| $P_{12}A$ | Aspergillus sp |
| $P_{12}B$ | Penicillium sp |
| $S_1$ | Fusarium sp |
| $S_2$ | Penicillium sp |
| $S_3$ | Monocillium sp |
| $S_4$ | Penicillium sp |
| $S_5$ | Penicillium sp |
| $S_6$ | Penicillium sp |
| $V_1$ | Penicillium sp |
| $V_2$ | Penicillium sp |
| AG | *Aspergillus glaucus* |
| OT | Penicillium sp $P_2D$ or $P_{12}B$ |
| AN | *Aspergillus niger* ATCC 1004 |
| KEN 1 | *Paecilomyces varioti* (appears brown) |
| KEN 2 | *Paecilomyces varioti* (appears white) |
| KEN 3 | *Rhodotorula glutins* |

TABLE C

Initial Compositions of Tested Systems In Aerated Water

| System | Solution of Eugenol[1] Wt. % | Vanillin Wt. % | Ethyl Vanillin Wt. % | Charsol C-3 Wt. % |
|---|---|---|---|---|
| A | — | — | — | — |
| B | — | — | — | 3.33 |
| C | 0.25 | — | — | — |
| D | 0.25 | 0.25 | — | — |
| E | 0.25 | — | 0.25 | — |
| F | 0.25 | — | — | 3.33 |
| G | — | 0.25 | — | — |
| H | — | 0.25 | 0.25 | — |
| I | — | — | 0.25 | — |

[1]50% wt. as-received eugenol. System wt. % reflect eugenol only.

TABLE D

Colony Count[9]
System Concentration (% wt. liquid phase) of Each Composition in PCA[1][2]

| | 0.10[3] Initial Count | 0.10[3] Final Count | 0.080[4] Initial Count | 0.080[4] Final Count | 0.062[5] Initial Count | 0.062[5] Final Count | 0.029[6] Initial Count | 0.029[6] Final Count | 0.0156[7] Initial Count | 0.0156[7] Final Count | 0.0016[8] Initial Count | 0.0016[8] Final Count |
|---|---|---|---|---|---|---|---|---|---|---|---|---|
| A Aerated Water Control | 12,308 $\Delta$ = +TNTC | TNTC | 9,790 $\Delta$ = +TNTC | TNTC | 7,692 $\Delta$ = +TNTC | TNTC | 3,620 $\Delta$ = +TNTC | TNTC | 1,923 $\Delta$ = +TNTC | TNTC | 204 $\Delta$ = +9,796 | 10,000 |
| B | 12,308 $\Delta$ = +TNTC | TNTC | 9,790 $\Delta$ = +TNTC | TNTC | 7,692 $\Delta$ = +TNTC | TNTC | 3,620 $\Delta$ = +TNTC | TNTC | 1,923 $\Delta$ = +TNTC | TNTC | 204 $\Delta$ = +46 | 250 |
| C | 12,308 $\Delta \cong$ −12,307 | <1 | 9,790 $\Delta \cong$ −9,789 | <1 | 7,692 $\Delta \cong$ −7,691 | <1 | 3,620 $\Delta \cong$ −3,619 | <1 | 1,923 $\Delta \cong$ −1,922 | <1 | 204 $\Delta \cong$ −203 | <1 |
| D | 12,308 $\Delta \cong$ −12,307 | <1 | 9,790 $\Delta \cong$ −9,789 | <1 | 7,692 $\Delta \cong$ −7,691 | <1 | 3,620 $\Delta \cong$ −3,620 | <1 | 1,923 $\Delta \cong$ −1,923 | <1 | 204 $\Delta \cong$ −203 | <1 |
| E | 12,308 $\Delta \cong$ −12,307 | <1 | 9,790 $\Delta \cong$ −9,789 | <1 | 7,692 $\Delta \cong$ −7,691 | <1 | 3,620 $\Delta \cong$ −3,619 | <1 | 1,923 $\Delta \cong$ −1,923 | <1 | 204 $\Delta \cong$ −203 | <1 |
| F | 12,308 $\Delta \cong$ −12,307 | <1 | 9,790 $\Delta \cong$ −9,789 | <1 | 7,692 $\Delta \cong$ −7,691 | <1 | 3,620 $\Delta \cong$ −3,619 | <1 | 1,923 $\Delta \cong$ −1,922 | <1 | 204 $\Delta \cong$ −203 | <1 |
| G | 12,308 $\Delta \cong$ −12,307 | <1 | 9,790 $\Delta \cong$ −9,789 | <1 | 7,692 $\Delta \cong$ −7,642 | 50 | 3,620 $\Delta \cong$ −3,121 | 500 | 1,923 $\Delta \cong$ −923 | 1000 | 204 $\Delta$ = +96 | 300 |
| H | 12,308 $\Delta \cong$ −12,307 | <1 | 9,790 $\Delta \cong$ −9,789 | <1 | 7,692 $\Delta \cong$ −7,691 | <1 | 3,620 $\Delta$ = +TNTC | TNTC | 1,923 $\Delta$ = +TNTC | TNTC | 204 $\Delta$ = +796 | 1,000 |
| I | 12,308 $\Delta \cong$ −12,307 | <1 | 9,790 $\Delta \cong$ −9,789 | <1 | 7,692 $\Delta \cong$ −6,692 | 1,000 | 3,620 $\Delta$ = +TNTC | TNTC | 1,923 $\Delta$ = +TNTC | TNTC | 204 $\Delta$ = +796 | 1,000 |

[1]TNTC - Denotes too numerous to count.
[2]C-3 Liquid Smoke conversions as % dimethoxyphenol (DMP) for Samples B, are [3]0.0064, [4]0.0051, [5]0.0040, [6]0.0019, [7]0.0010, [8]0.0001% DMP.
[9]Initial counts are average and final counts are actual.

TABLE E

Colony Count[9]
System Concentration (% wt. liquid phase) of Each Composition in PDA[1][2]

| | 0.10[3] Initial Count | 0.10[3] Final Count | 0.080[4] Initial Count | 0.080[4] Final Count | 0.062[5] Initial Count | 0.062[5] Final Count | 0.029[6] Initial Count | 0.029[6] Final Count | 0.0156[7] Initial Count | 0.0156[7] Final Count | 0.0016[8] Initial Count | 0.0016[8] Final Count |
|---|---|---|---|---|---|---|---|---|---|---|---|---|
| A Aerated Water Control | 12,308 $\Delta$ = +TNTC | TNTC | 9,790 $\Delta$ = +TNTC | TNTC | 7,692 $\Delta$ = +TNTC | TNTC | 3,620 $\Delta$ = +TNTC | TNTC | 1,923 $\Delta$ = +TNTC | TNTC | 204 $\Delta$ = +TNTC | TNTC |
| B | 12,308 $\Delta$ = +TNTC | TNTC | 9,790 $\Delta$ = +TNTC | TNTC | 7,692 $\Delta$ = +TNTC | TNTC | 3,620 $\Delta$ = +TNTC | TNTC | 1,923 $\Delta$ = +TNTC | TNTC | 204 $\Delta$ = +296 | 500 |
| C | 12,308 $\Delta \cong$ −12,307 | <1 | 9,790 $\Delta \cong$ −9,789 | <1 | 7,692 $\Delta \cong$ −7,691 | <1 | 3,620 $\Delta \cong$ −3,619 | <1 | 1,923 $\Delta \cong$ −1,915 | <1 | 204 $\Delta$ = −200 | <1 |
| D | 12,308 | <1 | 9,790 | <1 | 7,692 | <1 | 3,620 | <1 | 1,923 | <1 | 204 | <1 |

TABLE E-continued

Colony Count[9]
System Concentration (% wt. liquid phase) of Each Composition in PDA[1][2]

| | Sample | | | | | | | | | | | |
|---|---|---|---|---|---|---|---|---|---|---|---|---|
| | 0.10[3] | | 0.080[4] | | 0.062[5] | | 0.029[6] | | 0.0156[7] | | 0.0016[8] | |
| | Initial Count | Final Count | Initial Count | Final Count | Initial Count | Final Count | Initial Count | Final Count | Initial Count | Final Count | Initial Count | Final Count |
| | $\Delta \simeq -12,307$ | | $\Delta \simeq -9,789$ | | $\Delta \simeq -7,691$ | | $\Delta \simeq -3,619$ | | $\Delta \simeq -1,922$ | | $\Delta = -202$ | |
| E | 12,308 | <1 | 9,790 | <1 | 7,692 | <1 | 3,620 | <1 | 1,923 | <1 | 204 | <1 |
| | $\Delta \simeq -12,307$ | | $\Delta \simeq -9,789$ | | $\Delta \simeq -7,691$ | | $\Delta \simeq -3,619$ | | $\Delta \simeq -1,922$ | | $\Delta = -202$ | |
| F | 12,308 | <1 | 9,790 | <1 | 7,692 | <1 | 3,620 | <1 | 1,923 | <1 | 204 | <1 |
| | $\Delta \simeq -12,307$ | | $\Delta \simeq -9,789$ | | $\Delta \simeq -7,691$ | | $\Delta \simeq -3,619$ | | $\Delta \simeq -1,922$ | | $\Delta \simeq -203$ | |
| G | 12,308 | <1 | 9,790 | <1 | 7,692 | 30 | 3,620 | 500 | 1,923 | 1000 | 204 | 250 |
| | $\Delta \simeq -12,307$ | | $\Delta = -9,789$ | | $\Delta \simeq -7,662$ | | $\Delta = -3,120$ | | $\Delta = -923$ | | $\Delta = +46$ | |
| H | 12,308 | <1 | 9,790 | <1 | 7,692 | <1 | 3,620 | 10,000 | 1,923 | 10,000 | 204 | 1,000 |
| | $\Delta \simeq -12,307$ | | $\Delta \simeq -9,789$ | | $\Delta \simeq -7,691$ | | $\Delta = +6,380$ | | $\Delta = +8,007$ | | $\Delta = +796$ | |
| I | 12,308 | <1 | 9,790 | <1 | 7,692 | <1 | 3,620 | 10,000 | 1,923 | 10,000 | 204 | 500 |
| | $\Delta \simeq -12,307$ | | $\Delta \simeq -9,789$ | | $\Delta = -7,691$ | | $\Delta = +6,380$ | | $\Delta = +8,077$ | | $\Delta = +296$ | |

Referring now to the Table D and E data of single component antimycotic systems, Charsol C-3 liquid smoke (sample B) was ineffective as an antimycotic at all concentrations. Its performance was substantially the same as control sample A, with no antimycotic. Eugenol (sample C) demonstrated effective antimycotic properties at the lowest tested concentration (0.0016 wt. %) in the sense of preventing microorganism growth. As a balance between a concentration sufficient to a prevent antimycotic growth and insufficient to impart a strong flavor to the casing or the processed food, the eugenol concentration is preferably between about 0.001 and about 0.13% of the casing article total weight.

Vanillin (sample G) was somewhat less effective than eugenol but demonstrated effective antimycotic properties at concentration of at least 0.029 wt. % for both PCA and PDA. For the same reasons discussed in connection with eugenol the vanillin concentrations is preferably between about 0.02 and about 0.13% of the casing article total weight.

Ethyl vanillin (sample I) was somewhat less effective than vanillin but demonstrated effective antimycotic properties at concentration of at least 0.062 wt. % for both PCA and PDA. For the previously discussed reasons, the ethyl vanillin concentration is preferably between about 0.05 and about 0.13% of the casing article total weight.

Of the tested binary systems, eugenol and vanillin (sample D) was an effective antimycotic at all concentrations, as was eugenol and ethyl vanillin (sample E). Eugenol and liquid smoke (sample F) was effective at all concentrations but this is believed due to the eugenol which was effective by itself (sample C). The combination of vanillin and ethyl vanillin (sample H) was effective at concentration of 0.062 wt. % for both PCA and PDA.

Based on the foregoing tests, the preferred antimycotic compounds in the present casing article are eugenol and ethyl vanillin, the former being especially preferred. This is because eugenol is commercially available in water-soluble non-volatile solutions as for example, polysorbate 60 solution, sold by the aforementioned Flavorchem Company. Because of its greater effectiveness, eugenol may be employed in lower concentration than ethyl vanillin. The latter is commercially available in an ethyl alcohol solvent system which requires special handling. Finally, eugenol in the form of clove extract is commercially used in certain meat spicing applications.

More particularly, for premoisturized "no soak" fibrous large size cellulosic casings as used in the SIR-MATIC food stuffing system of Viskase Corporation, eugenol may, for example, be introduced to the gel stock casing in an aqueous glycerine solution during the extrusion and drying step to result in a casing comprising 62.0% water, 20.5% glycerine and 0.024% eugenol, all on a bone dry cellulose casing weight basis (eugenol is 0.013% of the casing article total weight). The eugenol comprises 0.029% of the liquid phase, or 0.02 wt.% of the treatment solution.

For the same type of casing and the same aqueous glycerine solution, ethyl vanillin may comprise 0.066% on a bone dry cellulose casing weight basis (0.036% of the casing article total weight), or 0.080% of the liquid phase weight. This corresponds to 0.05 wt. % ethyl vanillin in the treatment solution. If the desired antimycotic is vanillin, for the same type of casing and the same aqueous glycerine solution, vanillin may comprise 0.066% on a bone dry cellulose casing weight basis (0.036% of the casing article total weight), or 0.080% of the liquid phase weight. This corresponds to 0.05 wt.% vanillin in the treatment solution.

The antimycotic is preferably introduced in "no soak" fibrous casing of the aforedescribed type by inclusion in the aqueous moisturizing solution prior to shirring (for shirred articles) on roll processing (for rolled articles). By way of illustration for the eugenol embodiment and to obtain a concentration of 0.013% of the article total weight, the aqueous solution may comprise 62.0% water, 20.5% glycerine and 0.024% eugenol all on a dry cellulose casing weight basis. In this particular method of introduction eugenol comprises 0.029% of the liquid phase or 0.06 wt.% of the treatment solution. For incorporation of ethyl vanillin by this method to a concentration of 0.036% of the casing article total weight, the latter comprises 0.066% on a dry cellulose casing weight basis (0.036% of the casing article total weight), or 0.80% of the liquid phase weight. This corresponds to 0.17 wt. % ethyl vanillin in the aqueous treatment solution. If the desired antimycotic is vanillin, for a concentration of 0.036% of the casing article total weight in the same type of casing and the same aqueous glycerine solution, vanillin may comprise 0.066 wt. % on a dry cellulose basis or 0.80% of the liquid phase.

EXAMPLE II

Unlike the widely practiced water activity reduction approach to preventing mold and yeast growth in cellulosic casings, the article of this invention kills the microorganisms. This was demonstrated by a series of tests in which ethyl vanillin and eugenol single component antimycotic aqueous systems were prepared in the Example I manner and mixed at a series of concentrations with plate count agar (PCA). The water activities of these systems were measured and the results are summarized in Table F.

TABLE F

| Sample | Antimycotic | Water Activity Liquid Phase Concentration (Wt %) | Water Activity[1] |
|---|---|---|---|
| K | ethyl vanillin | 0.08 | 0.947 |
| L | ethyl vanillin | 0.06 | 0.947 |
| M | ethyl vanillin | 0.04 | 0.953 |
| N | ethyl vanillin | 0.02 | 0.964 |
| O | ethyl vanillin | 0.01 | 0.994 |
| P | ethyl vanillin | 0.005 | 0.962 |
| Q | eugenol | 0.035 | 0.960 |
| R | eugenol | 0.030 | 0.958 |

[1]All samples except P were measured at about 20° C. using a Rotronic Hydroskop DT moisture meter with a model WA measuring station (manufactured by Rotronic AG, Zurich, Switzerland). Sample P was measured at 17.7° C.

Table F shows that the antimycotic of this invention do not reduce the water activity, because all tested samples have very high water activity. Instead, the mechanism of these antimycotic is to actually kill the yeasts and molds.

EXAMPLE III

Another series of tests were conducted to compare the performance characteristics of the small diameter casing articles of this invention with casings lacking the antimycotic compound but otherwise identical. In these tests the casings were the small size (No. 21 with recommended stuff diameter of about 18.8–19.8 mm.) cellulose type both with a peeling aid (E-Z Peel NOJAX casing) and without (regular casing) manufactured and sold by Viskase Corporation. The meat emulsion was commercially-prepared high quality mixture with 50% beef chuck and 50% regular pork trim. The casing was manufactured in the conventional manner and the two antimycotics were introduced in separate samples by inclusion in the moisturizing spray solution immediately prior to shirring. The antimycotic loadings were 0.05 wt. % (dry cellulose basis) or 0.035 wt. % (total casing article basis) ethyl vanillin and 0.015 wt. % (dry cellulose basis) or 0.010 wt. % (total casing article basis) clove (eugenol) extract. The casings were then stuffed with the meat emulsion on commerical-type equipment.

The effect of these antimycotic on sizing, breakage, peelability, meat surface color, flavor and odor were measured. Sizing characteristics (variation in stuffed diameter) for the control and antimycotic-treated casings were generally similar. Coherency (the ability of the shirred stick to resist torsional breakage) for the clove and control samples was fair and good, respectively. Peelability was 100% for all samples. Colormetric values and color panelists agreed that the meat surface color was not significantly effected by the antimycotic treatments.

The distinctive clove and vanillin odors were identifiable in the as-manufactured casings but muted when shirred into stick form. However, these odors became much stronger as the sticks deshirred during stuffing with the meat emulsion. Taste panelists were asked to judge the magnitude of flavor and odor difference between antimycotictreated samples and the control. Panelists noted the processed meat from the ethyl vanillin-treated casings as slightly to moderately different from the control. Four of sixteen panelists characterized the flavor as "sweet" or "vanilla". The clove-treated samples were less noticeable in difference with panelists rating them as only slightly different from the control. Only one of sixteen panelists recognized the clove flavor.

It was concluded from Example III that the ethyl vanillin and clove-treated small diameter casing articles would be commercially acceptable.

EXAMPLE IV

Still another series of tests were performed to compare the color and flavor of bologna stuffed in large diameter fiber reinforced cellulosic casing articles with ethyl vanillin or dilute liquid smoke (Charsol C-3) antimycotic. The loading of ethyl vanillin (0.127 wt. % liquid phase or 0.064% total casing weight) was at a level which provides effective protection against growth of the antimycotic-resistant microorganisms. The liquid smoke loading (1.69% liquid phase or 0.650% total casing weight) was at a level which does not provide effective protection against growth of the antimycotic-resistant microorganisms.

The casings were No. 7R (recommended stuff diameter 4.47 inches) casing manufactured by Viskase Corporation and the antimycotics were introduced to the as-manufactured casing by external moisturization with aqueous solutions containing the antimycotic. The bologna emulsion was commercial grade and stuffed into the casings with conventional SIRMATIC equipment, then processed under conditions commonly used in packing houses. The control sample did not have antimycotic protection other than the glycerine concentration conventionally used for softening.

Examination of the processed meat revealed no differences between the three samples in terms of color and flavor. This demonstrates that the casing article of the invention effectively prevents growth of the antimycotic-resistant microorganisms without effecting the color or flavor of meat processed therein.

Based on the foregoing examples, eugenol was the most effective antimycotic and at concentration as low as 0.0005 wt. % of the casing article. This represents a preferred lower limit in the practice of this invention.

While this invention has been described with reference to certain specific embodiments, it will be recognized by those skilled in this art that many variations are possible without departing from the scope and spirit of the invention, and that it is intended to cover all changes and modifications of the invention disclosed herein for the purposes of illustration, which do not constitute departure from the spirit and scope of the invention.

What is claimed is:

1. A moisturized cellulosic casing article with water activity of at least 0.80 and having in the casing wall a spice-derived natural or synthetic equivalent antimycotic compound, imparting a food-related odor to the casing, at a concentration below about 0.2 percent based on the total casing article weight, the antimycotic compound comprising a benzene ring containing at least one phenolic hydroxyl group with at least two hydrogen substitutions (F) wherein F is a member selected from the group consisting of alkoxy, alkyl and acyl groups and wherein at least one of the F members is either an acyl group of comprises at least two carbon atoms.

2. A casing article according to claim 1 wherein said spice-derived natural or synthetic equivalent antimycotic compound is at least 0.0005 percent of the total casing article weight.

3. A casing article according to claim 1 wherein the antimycotic compound is eugenol.

4. A casing article according to claim 3 wherein said eugenol comprises between about 0.001 and about 0.13 percent of the casing article total weight.

5. A casing article according to claim 1 wherein the antimycotic compound is vanillin.

6. A casing article according to claim 5 wherein said vanillin comprises between about 0.02 and about 0.13 percent of the casing article total weight.

7. A casing article according to claim 1 wherein the antimycotic compound is ethyl vanillin.

8. A casing article according to claim 7 wherein said ethyl vanillin comprises between about 0.05 and about 0.13 weight percent of the casing article total weight.

9. A casing article according to claim 1 wherein the cellulosic casing is nonreinforced and contains between about 15 and about 30 percent water of the casing article total weight.

10. A casing article according to claim 9 wherein polyol comprises less than about 16 percent of the casing article dry cellulose weight.

11. A casing article according to claim 1 wherein the cellulosic casing is fiber-reinforced and contains between about 17 and about 75 percent water of the casing article total weight.

12. A casing article according to claim 11 wherein polyol comprises less than about 23 percent of the casing article dry cellulose weight.

* * * * *

UNITED STATES PATENT AND TRADEMARK OFFICE
CERTIFICATE OF CORRECTION

PATENT NO. : 4,874,622

DATED : October 17, 1989

INVENTOR(S) : Dennis Alan Gaynor and James Richard Hansen

It is certified that error appears in the above-identified patent and that said Letters Patent is hereby corrected as shown below:

In col. 1, line 10, the end of the sentence is missing and should be --yeasts and molds normally present in casing and food manufacturing environments, including certain microorganisms which grow in the presence of well-known antimycotics.--.
In col. 2, line 38, change "about 2%" to --about 25%--.
In col. 7, line 31, change "0618" to --0.618--.
In col. 8, line 9, change "(vannillin)." to --(vanillin).--.
In col. 8, line 35, change "madein" to --made in--.
In col. 11, line 26, change "to a" to --to--.
In col. 11, line 35, change "concentrations" to --concentration--.
In col. 11, line 68, change "SIRMATIC" to --SHIRMATIC--.
In col. 12, line 56, change "0.80%" to --0.080%--.
In col. 12, line 62, change "0.80%" to --0.080%--.
In col. 14, line 30, change "SIRMATIC" to --SHIRMATIC--.
In col. 14, line 66, change "of" to --or--.

Signed and Sealed this

Seventeenth Day of March, 1992

Attest:

HARRY F. MANBECK, JR.

*Attesting Officer*          Commissioner of Patents and Trademarks